(12) United States Patent
Kinugasa et al.

(10) Patent No.: US 7,439,936 B2
(45) Date of Patent: Oct. 21, 2008

(54) CONTROL CIRCUIT FOR DISPLAYING THE SAME VIDEO SIMULTANEOUSLY TO TWO OR MORE PANELS

(75) Inventors: Norihide Kinugasa, Kyoto (JP); Yoshio Nirasawa, Kyoto (JP); Hideo Hamaguchi, Osaka (JP); Sachi Ota, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 670 days.

(21) Appl. No.: 10/995,106

(22) Filed: Nov. 24, 2004

(65) Prior Publication Data

US 2005/0156812 A1 Jul. 21, 2005

(30) Foreign Application Priority Data

Jan. 7, 2004 (JP) ............................. 2004-001650

(51) Int. Cl.
*G09G 5/00* (2006.01)
(52) U.S. Cl. ......................................... 345/1.1; 345/99
(58) Field of Classification Search ........... 345/1.1–3.4, 345/212–213, 99
See application file for complete search history.

(56) References Cited

U.S. PATENT DOCUMENTS

| | | | | |
|---|---|---|---|---|
| 5,018,076 A | * | 5/1991 | Johary et al. | ................. 345/573 |
| 6,107,984 A | * | 8/2000 | Naka et al. | ................... 345/99 |
| 2004/0169618 A1 | * | 9/2004 | Nakai et al. | ................. 345/1.1 |

FOREIGN PATENT DOCUMENTS

JP 2-137586 5/1990

* cited by examiner

*Primary Examiner*—Chanh Nguyen
*Assistant Examiner*—Bao-Quan T Ho
(74) *Attorney, Agent, or Firm*—McDermott Will & Emery LLP (57) ABSTRACT

A display panel control circuit includes a voltage controlled oscillator (VCO) for outputting a clock signal, a first-panel horizontal system pulse generation section, a second-panel horizontal system pulse generation section, a vertical system pulse generation section which is commonly used among the first and second panels, a phase comparator, and a smoothing element. The first-panel horizontal system pulse generation section and the second-panel horizontal system pulse generation section respectively generate a reference signal of a first-panel horizontal system output group and a reference signal of a second-panel horizontal system output group from signal VCOCLK1 output from the VCO. Thus, it is possible to simultaneously drive two different panels.

3 Claims, 10 Drawing Sheets

CONTROL CIRCUIT FOR DISPLAYING THE SAME VIDEO SIMULTANEOUSLY TO TWO OR MORE PANELS

CROSS-REFERENCE TO RELATED APPLICATION

This application claims priority under 35 U.S.C. §119(a) on Japanese Patent Application No. 2004-1650 filed on Jan. 7, 2004, the entire contents of which are hereby incorporated by reference.

BACKGROUND OF THE INVENTION

1. Field of the Invention

The present invention relates to a display panel control circuit for controlling the operation of a display panel, such as a liquid crystal panel, or the like, and specifically to a display panel control circuit for simultaneously driving two display panels which operate based on different driving methods.

2. Description of the Prior Art

The liquid crystal display device which displays images using so-called liquid crystals has been widespread. For example, the liquid crystal display device, which includes a control circuit of a liquid crystal panel, is incorporated in a digital video camera (DVC), a digital still camera (DSC), or other AV devices.

Figure 4:
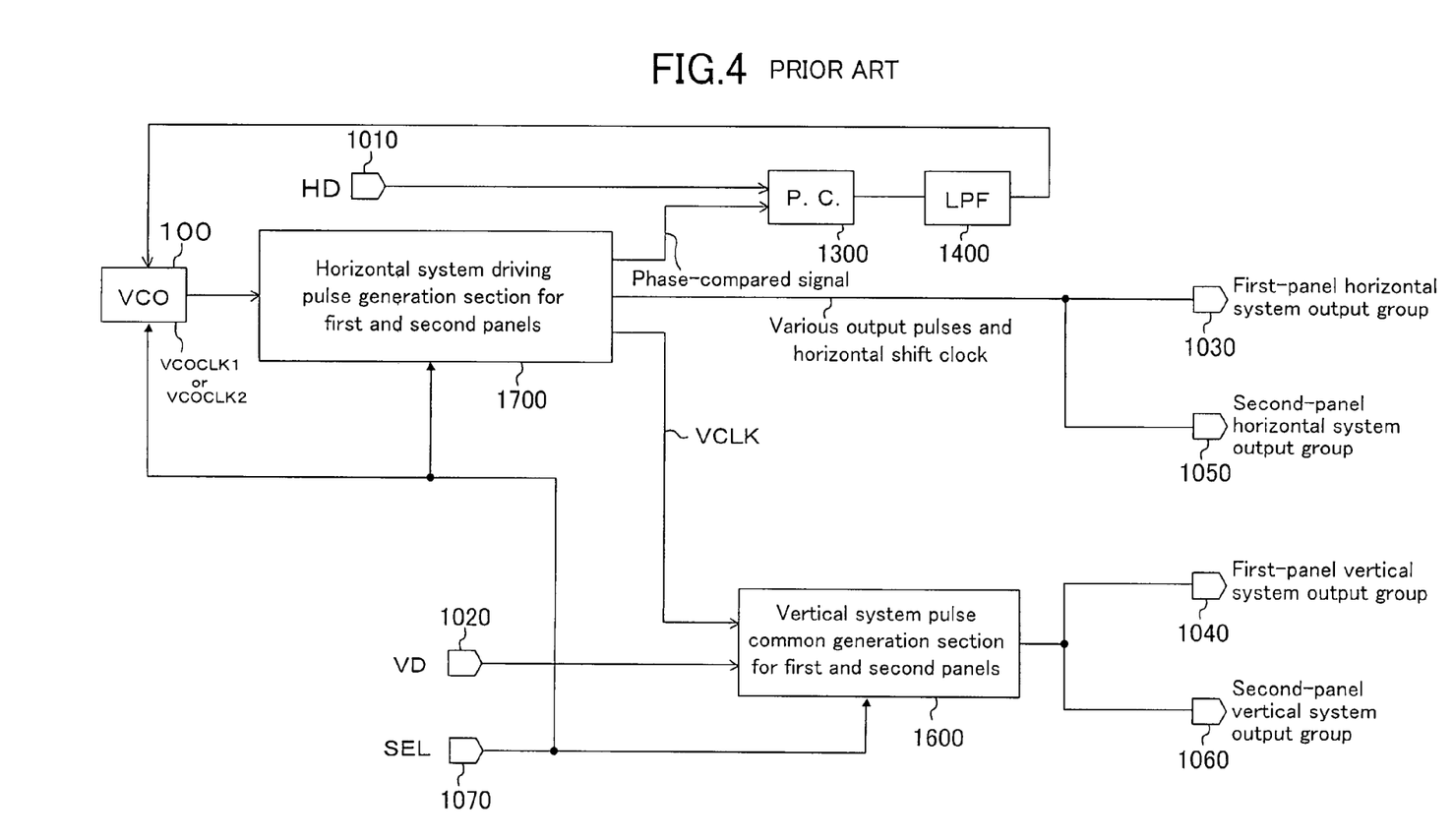
FIG. 4 is a block diagram showing a structure of a conventional liquid crystal panel display control circuit.
Figure 5:
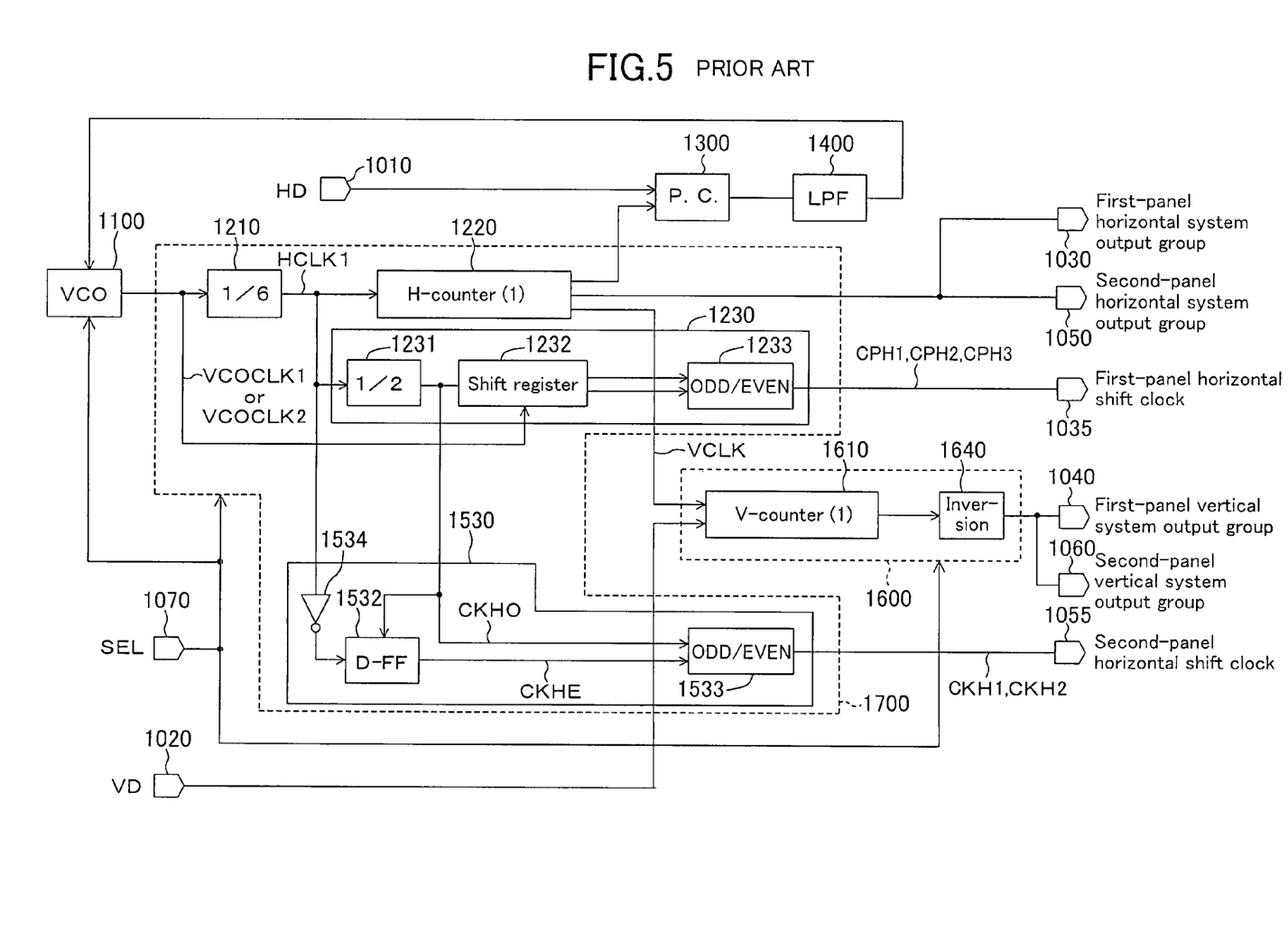
FIG. 5 is a block diagram showing a detailed structure of the conventional liquid crystal panel display control circuit.

A conventional liquid crystal panel control circuit is now described with reference to FIGS. 4 to 10. FIG. 4 is a block circuit diagram showing a structure of the conventional liquid crystal panel control circuit. FIG. 5 is a block circuit diagram showing a detailed structure of the conventional liquid crystal panel control circuit. This control circuit is used for a digital video camera having two liquid crystal panels, or the like.

The conventional display panel control circuit includes a voltage controlled oscillator (VCO) 1100, a horizontal system driving pulse generation section 1700 which works for first and second panels, a phase comparator 1300 for outputting a phase error between horizontal synchronization signal HD input through a horizontal synchronization signal input terminal 1010 and a phase-compared signal which is an output signal of the horizontal system driving pulse generation section 1700, a smoothing element (LPF) 1400 for smoothing the phase error output from the phase comparator 1300 and feeding back the smoothed phase error to the VCO 1100, and a vertical system driving pulse generation section 1600 for the first and second panels, which receives signal VCLK output from the horizontal system driving pulse generation section 1700 and vertical synchronization signal VD input through a vertical synchronization signal input terminal 1020. In the conventional display panel control circuit, the operations of the VCO 1100, the horizontal system driving pulse generation section 1700 and the vertical system driving pulse generation section 1600 are switched according to panel selection signal SEL. Specifically, the signal input to the horizontal system driving pulse generation section 1700 is switched between a signal for the first panel and a signal for the second panel according to the "High"/"Low" of panel selection signal SEL. More specifically, the VCO 1100 outputs clock signal VCO-CLK1 for the first panel or clock signal VCOCLK2 for the second panel according to panel selection signal SEL. The horizontal system driving pulse generation section 1700 outputs a group of horizontal system outputs for the first panel through a horizontal system output group terminal 1030 for the first panel or a group of horizontal system outputs for the second panel through a horizontal system output group terminal 1050 for the second panel according to panel selection signal SEL. The vertical system driving pulse generation section 1600 outputs a group of vertical system outputs for the first panel through a first-panel vertical system output group terminal 1040 or a group of vertical system outputs for the second panel through a second-panel vertical system output group terminal 1060 according to panel selection signal SEL.

The liquid crystal panel driving methods include a single-pixel sequential transfer method wherein three pixels corresponding to R (red), G (green) and B (blue) are sequentially driven and a three-pixel simultaneous transfer method wherein three pixels of R, G and B are simultaneously driven for display. In the single-pixel sequential transfer method, the horizontal shift clock is mainly realized by pulse signals of three phases. In three-pixel simultaneous transfer method, the horizontal shift clock is mainly realized by pulse signals of two phases.

In a liquid crystal panel wherein pixels are in a delta arrangement, it is necessary to control the phase of the horizontal shift clock such that the phase conforms to the pixel arrangement in each of the odd-numbered row (ODD line) and the even-numbered row (EVEN line).

FIG. 5 shows an example of a display panel control circuit for controlling a panel based on the single-pixel sequential transfer method (first panel) and a panel based on the three-pixel simultaneous transfer method (second panel).

In the horizontal system driving pulse generation section 1700 of the display panel control circuit of FIG. 5, signal VCOCLK1 or VCOCLK2 output from the VCO 1100 is input to a ⅙ frequency divider 1210, and signal HCLK1 output from the ⅙ frequency divider 1210 is used as a clock signal in an H-counter (1) 1220. Signal HCLK1 is also input to a first-panel horizontal shift clock generation section 1230 and a second-panel horizontal shift clock generation section 1530.

One of the plurality of signals output from the H-counter (1) 1220 is supplied to the phase comparator 1300. Output signal VCLK is supplied to the vertical system driving pulse generation section 1600. A group of the other signals output from the H-counter (1) 1220 is transmitted to the horizontal system output group terminal 1030 or the horizontal system output group terminal 1050.

The first-panel horizontal shift clock generation section 1230 includes a ½ frequency divider 1231 which receives HCLK1 as a clock, a shift register 1232 which receives VCO-CLK1 or VCOCLK2 output from the VCO 1100 as a clock, a switch section 1233 for switching the phase of the signal output from the shift register 1232 between the ODD lines and the EVEN lines of a liquid crystal panel where pixels are in a delta arrangement. The first-panel horizontal shift clock generation section 1230 outputs horizontal shift clocks CPH1, CPH2 and CPH3 of three different phases for the first panel, which are the output signals of the switch section 1233, through a first-panel horizontal shift clock output terminal 1035.

The second-panel horizontal shift clock generation section 1530 includes an inverter 1534 which receives HCLK1, a D-type flip flop (D-FF) 1532 which receives the output of the inverter 1534 as a clock and the output of the ½ frequency divider 1231 as a D-input, and a switch section 1533 for switching the output of the ½ frequency divider 1231 and the output of the D-FF 1532 between the ODD lines and the EVEN lines of a liquid crystal panel where pixels are in a delta arrangement. The switch section 1533 outputs horizontal shift clocks CKH1 and CKH2 of two different phases for the second panel through a second-panel horizontal shift clock output terminal 1055.

The vertical system driving pulse generation section 1600 includes a V-counter (1) 1610 which receives signal VCLK as a clock input and an inversion section 1640 for inverting the logic of each output of the V-counter (1) 1610. A group of the outputs of the inversion section 1640 is output to the first-panel vertical system output group terminal 1040 or the second-panel vertical system output group terminal 1060.

In the conventional display panel control circuit described herein, the operations of the VCO 1100, the horizontal system driving pulse generation section 1700 and the vertical system driving pulse generation section 1600 are switched according to panel selection signal SEL between the operations for the first panel and the operations for the second panel.

Figure 6:
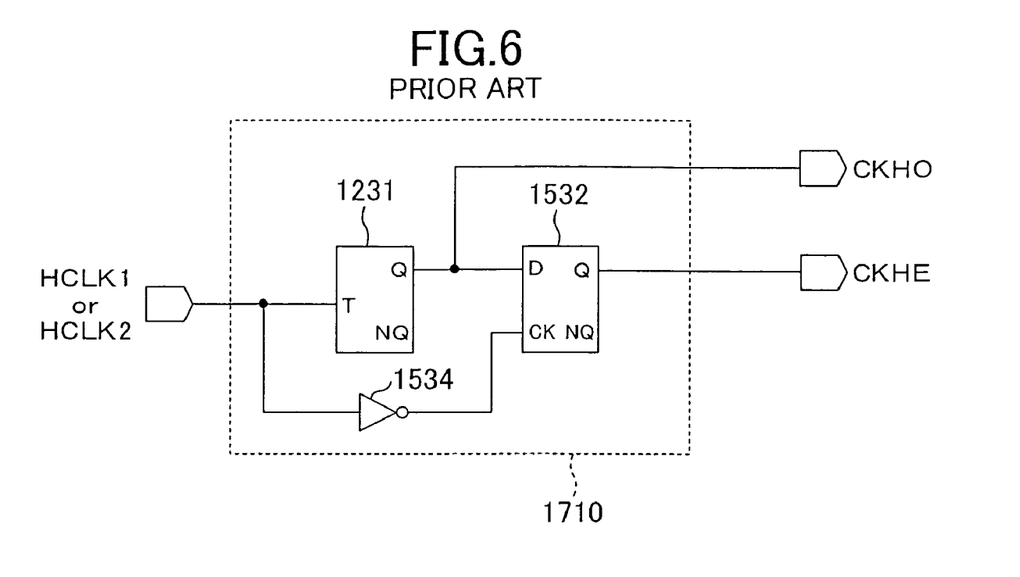
FIG. 6 is a circuit diagram showing a structure of a part of the conventional display panel control circuit.

FIG. 6 is a circuit diagram showing a structure of a part of the conventional display panel control circuit. FIG. 6 shows the connections of the ½ frequency divider 1231 which is a component of the first-panel horizontal shift clock generation section 1230 and the D-FF 1532 and the inverter 1534 which are components of the second-panel horizontal shift clock generation section 1530. In FIG. 6, "CKHO" is the output signal of the ½ frequency divider 1231, and "CKHE" is the output signal of the D-FF 1532. The waveforms of these signals are shown in FIG. 8.

Figure 8:
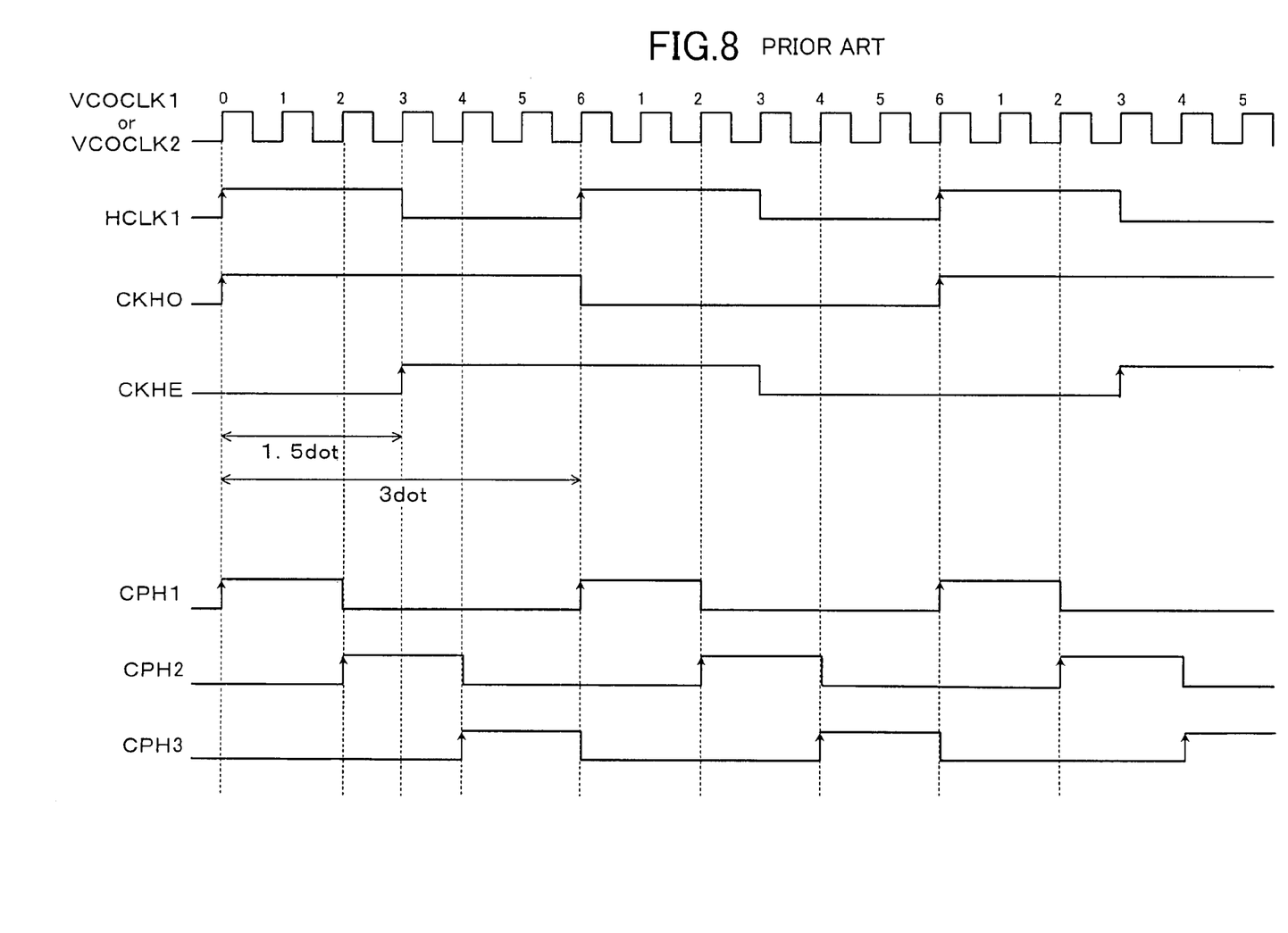
FIG. 8 shows the waveforms of horizontal shift clocks for the first and second panels which are output from the conventional display panel control circuit.

FIG. 8 shows the waveforms of the horizontal shift clocks for the first and second panels which are output from the conventional display panel control circuit. Herein, output signal CKHO of the ½ frequency divider 1231 is a horizontal shift clock for the ODD lines of the second panel, and output signal CKHE of the D-FF 1532 is a horizontal shift clock for the EVEN lines of the second panel. It should be noted that the ODD line horizontal shift clock and the EVEN line horizontal shift clock may be replaced by each other. As shown in FIG. 8, signal HCLK1 is obtained by dividing the frequency of VCOCLK1 or VCOCLK2 by 6, signal CKHO is obtained by dividing the frequency of HCLK1 by 2, and the phase of signal CKHE is different from that of signal CKHO by 90°.

Figure 7:
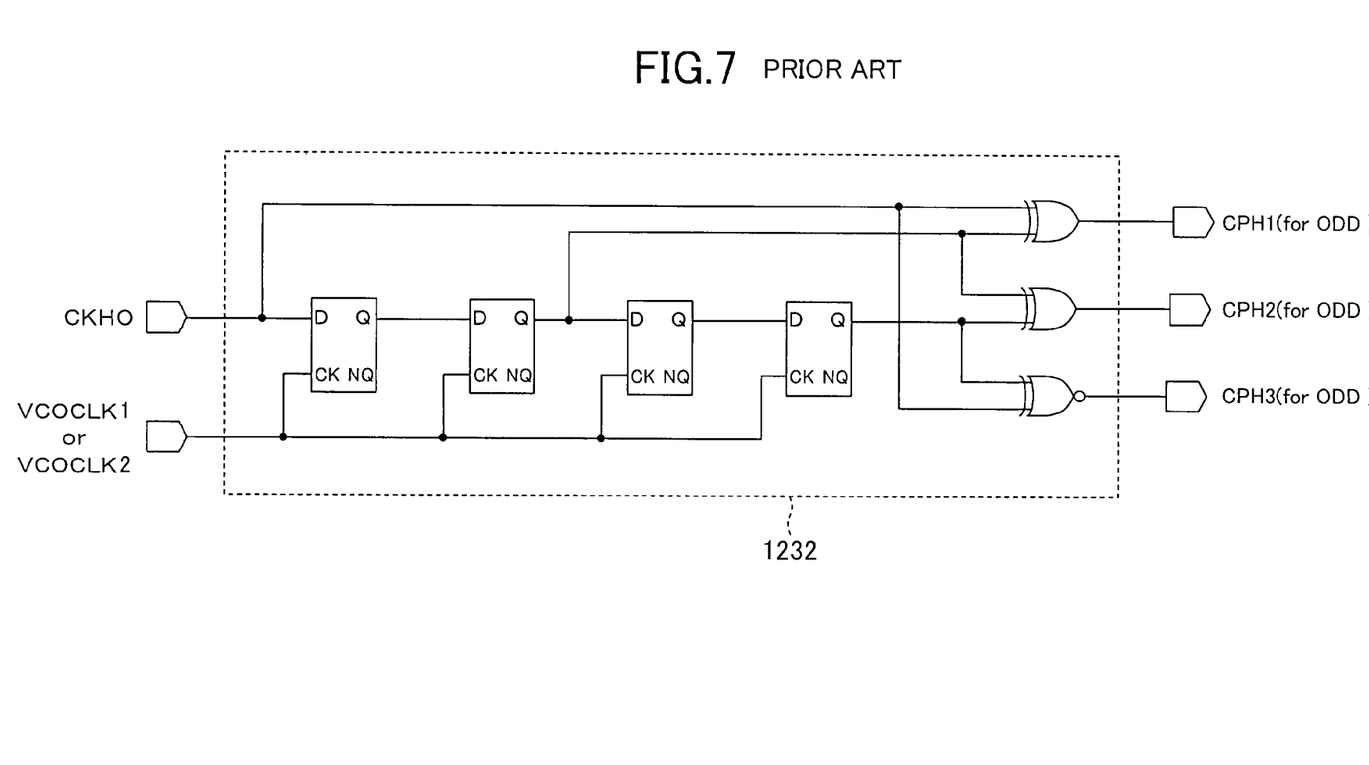
FIG. 7 is a circuit diagram showing a specific structure example of a shift register which is a component of a first-panel horizontal shift clock generation section of the conventional display panel control circuit.
Figure 9:
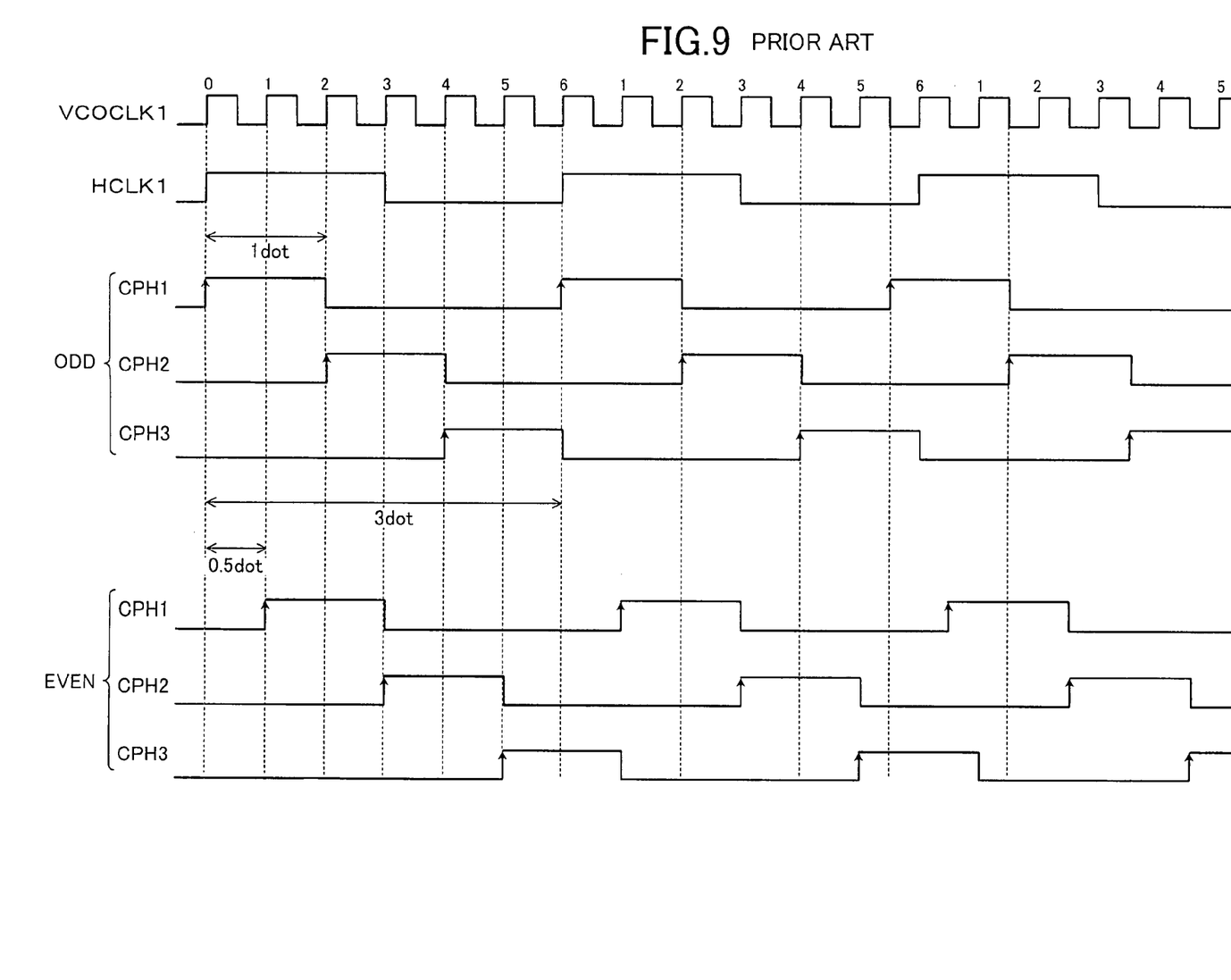
FIG. 9 shows the waveforms of horizontal shift clocks for the ODD lines and EVEN lines of the first panel in the conventional display panel control circuit.

FIG. 7 is a circuit diagram showing an example of a detailed structure of the shift register 1232 which is a component of the first-panel horizontal shift clock generation section 1230. In the shift register 1232, signal CKHO output from the ½ frequency divider 1231 is delayed using signal VCOCLK1 or VCOCLK2 output from the VCO 1100 on a 2-clock by 2-clock basis, and resultant signals are input to EX-OR and EX-NOR gates, thereby obtaining output signals CPH1, CPH2 and CPH3 of three different phases where a period corresponding to two clock cycles of signal VCOCLK1 or VCOCLK2 is High period. Signals CPH1, CPH2 and CPH3 of FIG. 8 are the horizontal shift clocks for the ODD lines of the first panel. Signals obtained by delaying signals CPH1, CPH2 and CPH3 by one clock cycle of VCOCLK1 or VCOCLK2 are used as the horizontal shift clocks for the EVEN lines. The circuit for obtaining signals CPH1, CPH2 and CPH3 for the EVEN lines is not shown in FIG. 7, but only the operation waveforms of these signals are shown in FIG. 9. It should be noted that the ODD line horizontal shift clock and the EVEN line horizontal shift clock may be replaced by each other.

FIG. 9 shows the waveforms of the ODD line horizontal shift clock and the EVEN line horizontal shift clock for the first panel. As shown in FIG. 9, a phase difference between the rising edges of signals CPH1, CPH2 and CPH3 is equal to the time period corresponding to one pixel (also referred to as "one dot") because the first panel is a delta arrangement panel which operates based on the single-pixel sequential transfer method using the three phase shift clocks. Further, since the single-pixel sequential transfer method is employed, shift correction by 0.5 pixel is necessary in each of the ODD line and the EVEN line. Signals CPH1, CPH2 and CPH3 are delayed by one cycle of VCOCLK1 to generate signals CPH1, CPH2 and CPH3 for the EVEN lines.

Figure 10:
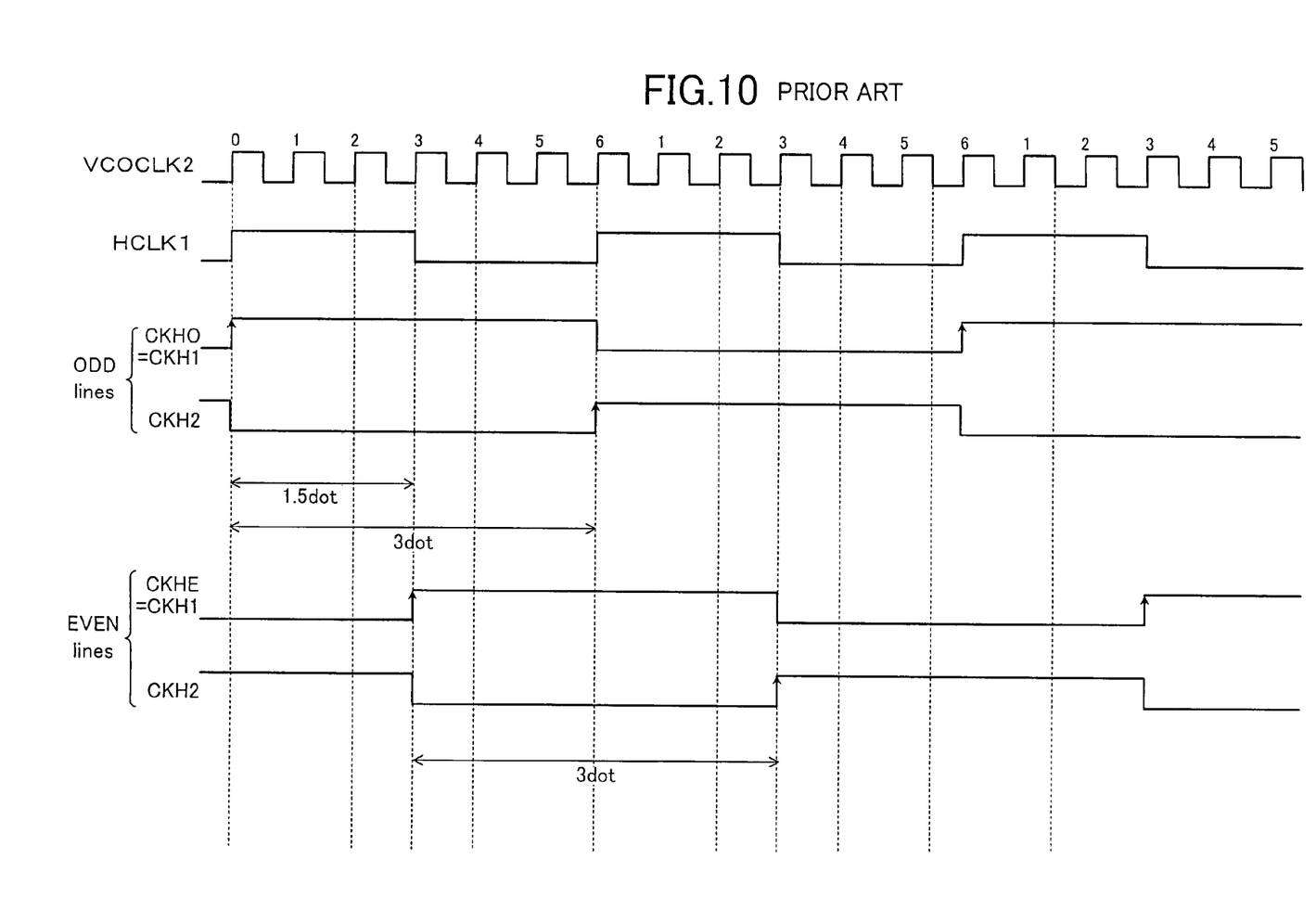
FIG. 10 shows the waveforms of horizontal shift clocks for the ODD lines and EVEN lines of the second panel in the conventional display panel control circuit.

As shown in FIG. 10, a phase difference between a rising edge of signal CKH2, which is an inverted signal of signal CKHO (=CKH1), and a rising edge of signal CKH1 is equal to the time period corresponding to three pixels (also referred to as "three dots") because the second panel is a delta arrangement panel which operates based on the three-pixel simultaneous transfer method using the two-phase shift clocks. FIG. 10 shows the waveforms of the ODD line horizontal shift clock and the EVEN line horizontal shift clock for the second panel. As shown in FIG. 10, as for the horizontal shift clock for the EVEN lines, CKHE=CKH1. Shift correction of 1.5 pixel is made to the horizontal shift clock for the EVEN lines with respect to the shift clock for the ODD lines.

SUMMARY OF THE INVENTION

In the above-described conventional display panel control circuit, at the time of display of the first panel, signal VCOCLK1 output from the VCO 1100 needs to be set to have the first frequency which is determined based on the cycle of one pixel of the first panel. At the time of display of the second panel, signal VCOCLK2 output from the VCO 1100 needs to be set to have the second frequency which is determined based on the cycle of one pixel of the second panel. Thus, the conventional display panel control circuit can alternately control display of the first panel and display of the second panel but cannot simultaneously control display of the first and second panels.

If two VCOs and a double PLL loop are provided, simultaneous display of two panels is possible. However, the circuit size increases when the display panel control circuit is realized in the form of an integrated circuit, and the area of the entire LSI device cannot be reduced.

Since in a conventional technique two LSI devices each having a display panel control circuit are used for simultaneous drive of two different types of liquid crystal panels, the area of an entire set incorporating the LSI devices is large.

Japanese Unexamined Patent Publication No. 2-137586 discloses a control circuit for a liquid crystal display device which overcomes problems relating to reproduction of still pictures in a VTR system. However, this control circuit is for driving a single display panel. None of the other prior documents discloses a control device or control circuit relating to simultaneous display of a plurality of liquid crystal panels.

The present invention was conceived for the purpose of solving the above problems that exist in the conventional techniques. An objective of the present invention is to provide a display panel control circuit wherein simultaneous display of two or more display panels is realized with a single VCO, and an increase in the circuit area is suppressed.

In order to solve the above objective, the present invention provides a display panel control circuit for controlling display of a first panel and a second panel, the control circuit comprising: a voltage controlled oscillator for outputting a clock signal; a first-panel horizontal system pulse generation section for outputting a horizontal system output pulse group for the first panel, the first-panel horizontal system pulse generation section including a first counter for counting the clock signal, the first counter being reset with a first frequency division ratio; and a second-panel horizontal system pulse generation section for outputting a horizontal system output pulse group for the second panel, the second-panel horizontal system pulse generation section including a second counter for counting the clock signal, the second counter being reset at a timing when the first counter is reset.

With the above structure, it is possible to generate a clock for the first counter and a clock for the second counter without switching the output signal of the voltage controlled oscillator. Thus, it is possible to simultaneously output the horizontal system output pulse group for the first panel and the horizontal system output pulse group for the second panel. Therefore, it is possible to simultaneously drive two display panels which operate based on different driving methods. For example, in the case where the display panel control circuit of the present invention is incorporated in a digital video camera, simultaneous display of a liquid crystal panel monitor and a liquid crystal panel finder is possible. Thus, for example, a subject can check a displayed image of himself/herself while being photographed by the camera. It should be noted that it is also possible to simultaneously drive three or more display panels using a display panel control circuit of the present invention.

Preferably, the display panel control circuit further comprises a vertical system pulse generation section for outputting a horizontal system output pulse group for the first and second panels, the vertical system pulse generation section including a third counter for counting an output signal of the first-panel horizontal system pulse generation section as a clock, the third counter being reset by a vertical synchronization signal.

The display panel control circuit further comprises: a phase comparator for comparing the phase of an output signal of the first-panel horizontal system pulse generation section and the phase of a horizontal synchronization signal; and a smoothing element which receives a comparison result from the phase comparator to feed back a phase error voltage to the voltage controlled oscillator. With this structure, the PLL operates such that the reset timing of the first counter is equal to the timing of externally-input horizontal synchronization signal HD. Thus, the reset timing of the counter of the second-panel horizontal system pulse generation section can also be set equal to the timing of the horizontal synchronization signal. Therefore, abnormalities in display can be prevented.

The first-panel horizontal system pulse generation section further includes a first frequency divider for dividing the frequency of the clock signal by N (N is a positive integer) to generate a clock for the first counter; and the second-panel horizontal system pulse generation section further includes a second frequency divider for dividing the frequency of the clock signal by M (M is a positive integer different from N) to generate a clock for the second counter. With this structure, different reference signals of the horizontal system output pulse groups can be generated for respective panels.

The first counter outputs a PLL reset signal to the second frequency divider and the second counter. With this structure, the horizontal shift clock and the horizontal system output pulse for the second panel can be set to be in synchronization with the horizontal synchronization signal. Therefore, abnormalities in display can be prevented.

The present invention provides a display panel control method for simultaneously controlling display of a first panel and a second panel using a display panel control circuit which includes a voltage controlled oscillator, a first-panel horizontal system pulse generation section including a first counter, and a second-panel horizontal system pulse generation section including a second counter, the method comprising the steps of: (a) generating a second clock signal from a first clock signal output from the voltage controlled oscillator; (b) outputting a horizontal system output pulse group for the first panel from the first panel horizontal system pulse generation section using the second clock signal as a clock; (c) generating a third clock signal from the first clock signal; and (d) outputting a horizontal system output pulse group for the second panel from the second panel horizontal system pulse generation section using the third clock signal as a clock.

With the above method, the first-panel horizontal system pulse generation section and the second-panel horizontal system pulse generation section receive the same clock signal but are capable of simultaneously outputting different horizontal system output pulse groups respectively for the first and second panels. Thus, it is possible to drive a plurality of panels which operate based on different driving methods or have different numbers of pixels.

The display panel control circuit further includes a phase comparator for comparing the phase of an output signal of the first-panel horizontal system pulse generation section and the phase of a horizontal synchronization signal, and a smoothing element which receives a comparison result from the phase comparator to feed back a phase error voltage to the voltage controlled oscillator; and the control method further includes the step of resetting the first counter at a predetermined timing, and the step of resetting the second counter at the timing when the first counter is reset. With this structure, the PLL operates such that the reset timing of the first counter is equal to the timing of externally-input horizontal syncluonization signal HD. Thus, the reset timing of the counter of the second-panel horizontal system pulse generation section can also be set equal to the timing of the horizontal synchronization signal. Therefore, abnormalities in display can be prevented.

DESCRIPTION OF THE PREFERRED EMBODIMENTS

Hereinafter, an embodiment of the present invention, which illustrates the best mode presently contemplated by the inventor(s) for carrying out the invention, is described in detail with reference to the drawings.

A liquid crystal display control circuit (display panel control circuit) according to an embodiment of the present invention is described with reference to FIGS. 1, 2 and 3. The liquid crystal display control circuit of this embodiment is used in an AV device (e.g., a digital video camera, a digital camera, or the like) having two liquid crystal panels.

Figure 1:
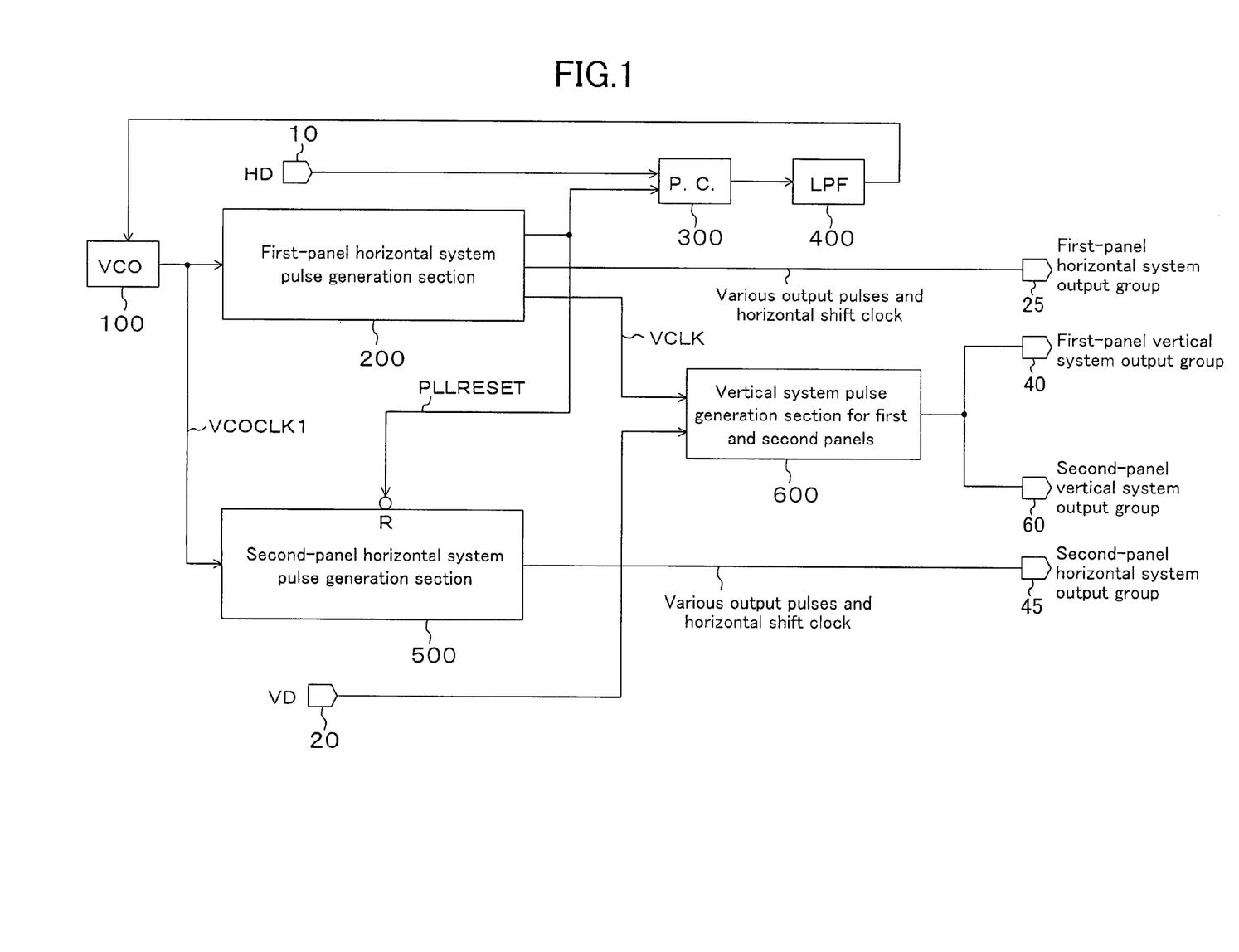
FIG. 1 is a block diagram showing a structure of a liquid crystal display control circuit according to an embodiment of the present invention.

FIG. 1 is a block diagram showing a structure of a liquid crystal display control circuit according to an embodiment of the present invention.

As shown in FIG. 1, a liquid crystal display control circuit of the present embodiment includes a voltage controlled oscillator (VCO) 100, a first-panel horizontal system pulse generation section 200, a second-panel horizontal system pulse generation section 500, a vertical system pulse generation section 600 which is commonly used among the first and second panels, a phase comparator 300, and a smoothing element (low pass filter (LPF)) 400. The VCO 100 changes the oscillation frequency according to a control voltage to output clock signal VCOCLK at an oscillation frequency which is n times the frequency of a reference input signal in a phase locked state. The first-panel horizontal system pulse generation section 200 has a counter for counting clock signal VCOCLK and a frequency divider. The counter of the pulse generation section 200 is reset with a predetermined frequency dividing ratio. The second-panel horizontal system pulse generation section 500 has a counter for counting clock signal VCOCLK and a frequency divider. The counter of the pulse generation section 500 is reset at a timing when the counter of the first-panel horizontal system pulse generation section 200 is reset. The vertical system pulse generation section 600 has a counter for counting the signal output from the first-panel horizontal system pulse generation section 200 (clock signal VCLK). The counter of the pulse generation section 600 is reset in synchronization with vertical synchronization signal VD which is input at a terminal 20. The phase comparator 300 compares the phase of signal PLL RESET output from the first-panel horizontal system pulse generation section 200 and the phase of horizontal synchronization signal HD which is input at a terminal 10. The LPF 400 receives the output of the phase comparator 300 to feed back a phase error voltage to the VCO 100. It should be noted that clock signal VCLK and signal PLL RESET, which are the output signals of the first-panel horizontal system pulse generation section 200, may be different signals or may be the same signal.

The first-panel horizontal system pulse generation section 200 sends a group of first-panel horizontal system output pulses to an output terminal 25. The second-panel horizontal system pulse generation section 500 sends a group of second-panel horizontal system output pulses to an output terminal 45. The vertical system pulse generation section 600 sends a group of first-panel vertical system output pulses to a first-panel vertical system output group terminal 40. The vertical system pulse generation section 600 sends a group of second-panel vertical system output pulses to a second-panel vertical system output group terminal 60. The first-panel horizontal system output pulse group includes various output pulses which are necessary for driving the first panel and a horizontal shift clock. The second-panel horizontal system output pulse group includes various output pulses which are necessary for driving the second panel and a horizontal shift clock.

In the liquid crystal display control circuit of the present embodiment, a phase-compared signal in the phase comparator in the PLL and a signal for resetting the counter of the second-panel horizontal system pulse generation section 500 are realized by the same signal, PLL RESET, but may be different signals. The counter of the first-panel horizontal system pulse generation section 200 needs to operate for at least one horizontal interval, i.e., the cycle of 64 μsec, in order to generate phase-compared signal PLL RESET whose phase is to be compared with the phase of horizontal synchronization signal HD. The counter of the second-panel horizontal system pulse generation section 500 only needs to count the time up to horizontal blanking at the most. Thus, the second-panel horizontal system pulse generation section 500 may have a smaller scale than that of the first-panel horizontal system pulse generation section 200.

The vertical system pulse generation section 600 sends both the first-panel vertical system output pulse group and the second-panel vertical system output pulse group. That is, the common signals can be branched to the first and second panels because a group of pulses in the vertical direction is a timing output pulse group whose cycle is equal to one horizontal interval even if the first and second panels have different numbers of pixels or operate based on different driving methods.

Next, specific examples of the components of the liquid crystal display control circuit are described. FIG. 2 is a block diagram showing a specific structure example of the liquid crystal display control circuit of the present embodiment. In the example of FIG. 2, the first panel is a panel which operates based on a single-pixel sequential transfer method, and the second panel is a panel which operates based on a three-pixel simultaneous transfer method. In the case of a digital video camera, one of the first and second panels is used for a finder, and the other is used as a liquid crystal monitor for checking images.

Figure 2:
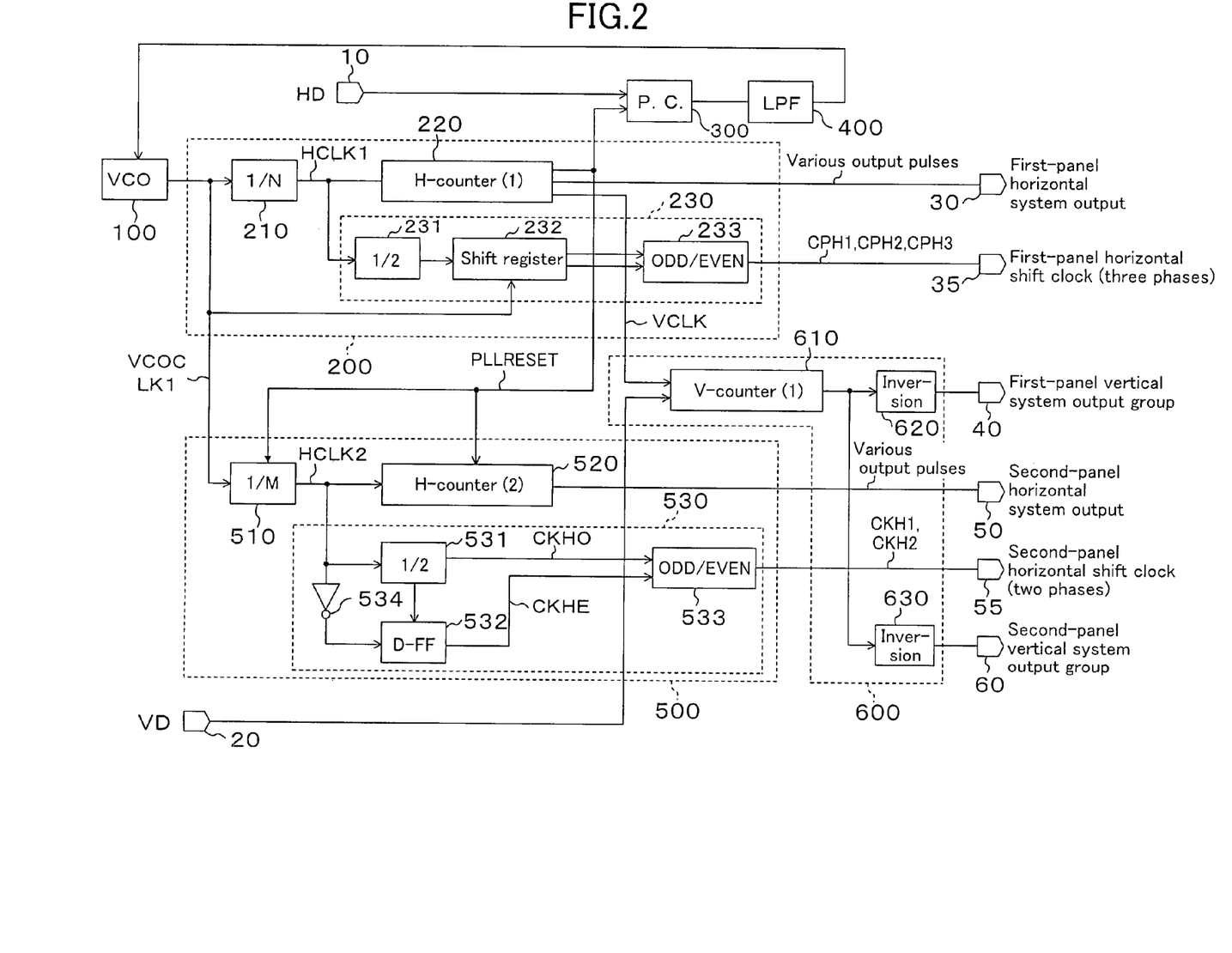
FIG. 2 is a block diagram showing a specific structure example of the liquid crystal display control circuit according to an embodiment of the present invention.

As shown in FIG. 2, the first-panel horizontal system pulse generation section 200 includes a ⅙ frequency divider (1/N frequency divider) 210, an H-counter (1) 220, and a first-panel horizontal shift clock generation section 230.

In the first-panel horizontal system pulse generation section 200, signal VCOCLK1 output from the VCO 100 is input to the ⅙ frequency divider 210, and signal HCLK1 output from the ⅙ frequency divider 210 is used as a clock signal in the H-counter (1) 220. Signal HCLK1 is also input to the first-panel horizontal shift clock generation section 230. Among the plurality of signals output from the H-counter (1) 220, signal PLL RESET is supplied to the phase comparator 300 and the second-panel horizontal system pulse generation section 500, the first-panel horizontal system output group is sent to a first-panel horizontal system output group terminal 30, and output signal VCLK is supplied to the vertical system pulse generation section 600.

The first-panel horizontal shift clock generation section 230 includes a ½ frequency divider 231 which receives HCLK1 as a clock, a shift register 232 which receives VCOCLK1 output from the VCO 100 as a clock and the output of the ½ frequency divider 231, and a switch section 233 for switching the output of the shift register 232 between the ODD lines and the EVEN lines of a liquid crystal panel where pixels are in a delta arrangement. The first-panel horizontal shift clock generation section 230 outputs horizontal shift clocks CPH1, CPH2 and CPH3 of three different phases for the first panel, which are the output signals of the switch section 233, through a first-panel horizontal shift clock output terminal 35. The first-panel horizontal shift clock generation section 230 is equivalent to the first-panel horizontal shift clock generation section 1230 of the conventional example. The first-panel horizontal system output group terminal 30 and the first-panel horizontal shift clock output terminal 35 shown in FIG. 2 correspond to the output terminal 25 shown in FIG. 1.

The second-panel horizontal system pulse generation section 500 includes a ⅕ frequency divider (1/M frequency divider) 510, an H-counter (2) 520, and a second-panel horizontal shift clock generation section 530.

The second-panel horizontal shift clock generation section 530 includes a ½ frequency divider 531, an inverter 534, a D-FF (flip-flop) 532 and a switch section 533.

In the second-panel horizontal system pulse generation section 500, the ⅕ frequency divider 510 divides the frequency of signal VCOCLK1 output from the VCO 100 by 5 to output signal HCLK2. The ⅕ frequency divider 510 also receives signal PLL RESET output from the H-counter (1) 220. Signal HCLK2 is used as a clock signal in the H-counter (2) 520 and is also used as a clock signal in the ½ frequency divider 531 of the second-panel horizontal shift clock generation section 530. Signal HCLK2 is input through the inverter 534 to a clock input terminal of the D-FF 532 which receives the output of the ½ frequency divider 531 as the D-input. Both the output of the ½ frequency divider 531 and the output of the D-FF 532 are input to the switch section 533, and the switch section 533 switches these inputs between the ODD lines and the EVEN lines of a liquid crystal panel where pixels are in a delta arrangement. The switch section 533 outputs horizontal shift clocks CKH1 and CKH2 of two different phases for the second panel through a second-panel horizontal shift clock output terminal 55. Horizontal shift clocks CKH1 and CKH2 are in synchronization with horizontal synchronization signal HD. The H-counter (2) 520 receives signal PLL RESET in addition to HCLK2 to output a second-panel horizontal system output which is in synchronization with horizontal synchronization signal HD to a second-panel horizontal system output group terminal 50. The second-panel horizontal system output group terminal 50 and the second-panel horizontal shift clock output terminal 55 shown in FIG. 2 correspond to the output terminal 45 shown in FIG. 1.

The difference between the liquid crystal display control circuit of the present embodiment and the conventional liquid crystal display control circuit resides in that the clocks output from the ½ frequency divider 231 and the ½ frequency divider 531, i.e., two reference signals which are used for generating the first-panel horizontal shift clock and the second-panel horizontal shift clock (HCLK1 and HCLK2), are simultaneously output. In the conventional liquid crystal display control circuit, signal HCLK1 is input to the ½ frequency divider 1231 (FIG. 5) commonly for the first and second panels. The output of the VCO 1100 is switched between VCOCLK1 and VCOCLK2 according to selection signal SEL for the cases of the first panel display and the second panel display, respectively. Therefore, the frequency of HCLK1 is different between the first panel display and the second panel display. Thus, in the conventional example, alternative display of the first and second panels is possible, but simultaneous display thereof is not possible.

According to the present embodiment of the present invention, the reference signal of the first-panel horizontal shift clock, HCLK1, and the reference signal of the second-panel horizontal shift clock, HCLK2, are generated from a single signal, VCOCLK1, without switching the system clock output from the VCO. Therefore, it is possible to simultaneously output the horizontal shift clocks for the second panel, CK1 and CKH2, and the horizontal shift clocks for the first panel, CPH1, CPH2 and CPH3. Thus, simultaneous display of the first panel and the second panel is possible.

It should be noted that reference signal HCLK1 of the first-panel horizontal shift clock of the conventional example is the same as reference signal HCLK1 of the first-panel horizontal shift clock of the present embodiment. However, reference signal HCLK1 of the second-panel horizontal shift clock of the conventional example has a frequency substantially equal to that of reference signal HCLK2 of the second-panel horizontal shift clock of the present embodiment, but these signals are not the same signal.

The circuit structure of the shift register 232 included in the first-panel horizontal shift clock generation section 230 is the same as that of the conventional shift register 1232 shown in FIG. 7. A circuit included in the second-panel horizontal shift clock generation section 530 for generating signals CKHO and CKHE is the same as the conventional circuit shown in FIG. 6 except that the ½ frequency divider 1231 is replaced by the ½ frequency divider 531, the inverter 1534 is replaced by the inverter 534, and the D-FF 1532 is replaced by the D-FF 532.

Figure 3:
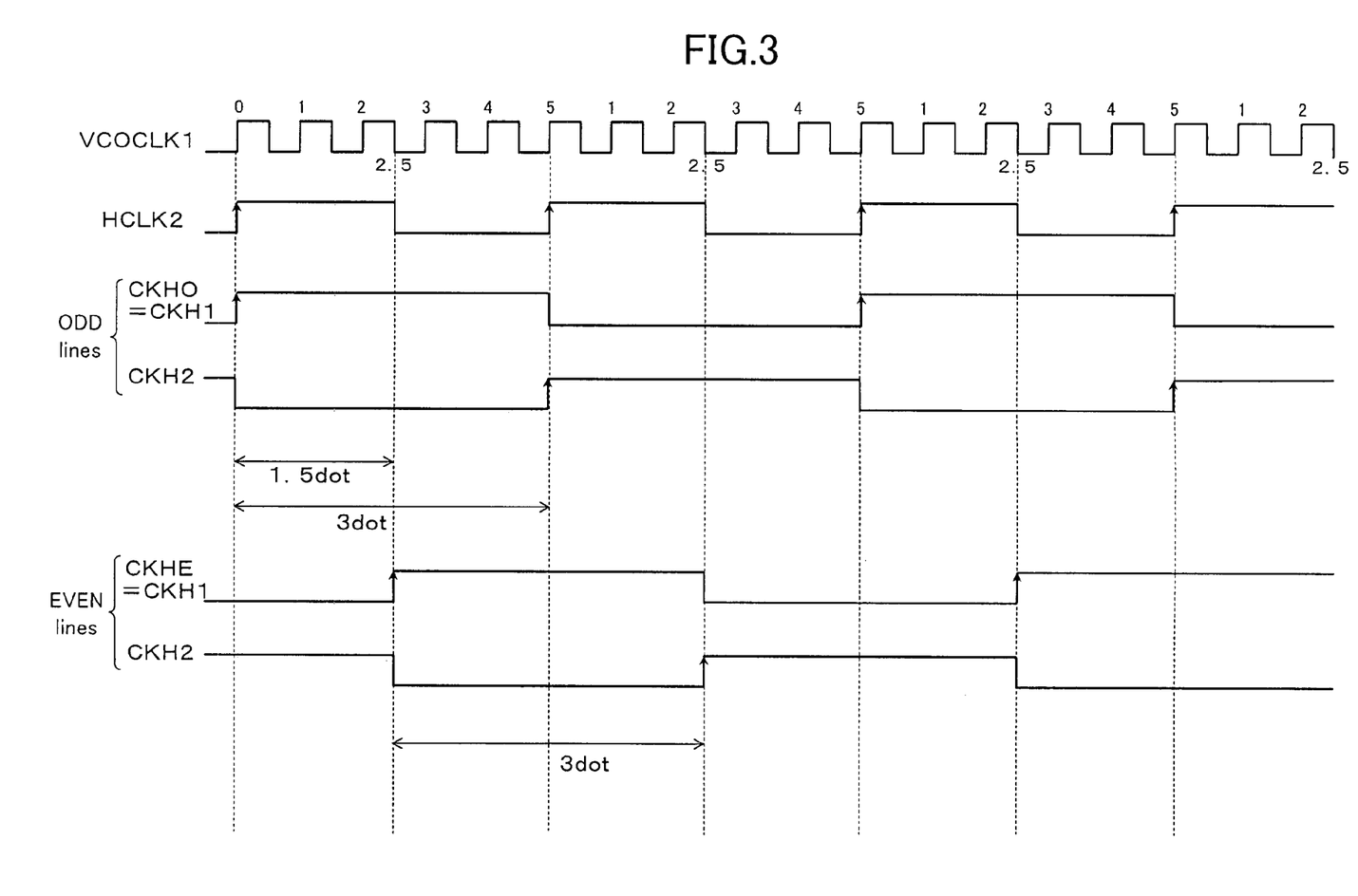
FIG. 3 shows the operation waveforms of the second-panel horizontal shift clock, etc., in the liquid crystal display control circuit according to an embodiment of the present invention.

FIG. 3 shows the operation waveforms of the horizontal shift clock for the second panel, etc., in the liquid crystal display control circuit of the present embodiment. As shown in FIG. 3, signal HCLK2 is obtained by dividing the frequency of VCOCLK1 by 5, and signal CKHO is obtained by dividing the frequency of HCLK2 by 2. Signal CKHE is obtained by delaying the phase of signal CKHO by 90°. A High period of signals CKHO and CKHE corresponds to three pixels of the second panel. In the example of the present embodiment, value M of the 1/M frequency divider is 5 such that HCLK2 for the second panel is generated from signal VCOCLK1 which is determined based on the pixel period of the first panel. In a specific example where the first panel includes 480 pixels and operates based on the single-pixel sequential transfer method and the second panel includes 521 pixels and operates based on the three-pixel simultaneous transfer method, when N=6 and M=5, both the first and second panels have a roundness factor substantially equal to 1.

Referring to shown in FIG. 2, the vertical system pulse generation section 600 receives signal VCLK as a clock. The vertical system pulse generation section 600 includes a V-counter (1) 610, to which vertical synchronization signal VD is input through the terminal 20, and inversion sections 620 and 630. A group of signals output from the inversion section 620 is output through the first-panel vertical system output group terminal 40. A group of signals output from the inversion section 630 is output through the second-panel vertical system output group terminal 60. The vertical system pulse generation section 600 has the same structure as that of the conventional liquid crystal display control circuit.

As described above, according to the liquid crystal display control circuit of the present embodiment, a plurality of panels which have different numbers of pixels or operate based on different driving methods can be simultaneously driven without providing separate control circuits. That is, two or more panels can be driven with a single VCO. Therefore, a control circuit can be realized with a single LSI device, and an increase in the circuit area can be suppressed. Thus, in the case where the liquid crystal display control circuit of the present embodiment is used in a digital video camera or a digital camera, a subject can check a displayed image of himself/herself while being photographed by the camera.

In the above-described example of the present embodiment, the panel which operates based on the single-pixel sequential transfer method and the panel which operates based on the three-pixel simultaneous transfer method are driven simultaneously. However, a liquid crystal display control circuit of the present invention can simultaneously drive a plurality of panels even if the panels are driven based on any other driving methods. Even in the case where the first and second panels operate based on the same transfer method but are only different in the number of pixels, it is possible to simultaneously drive the panels. Thus, panels incorporated in AV devices can be selected from the wider range of choices. For example, a low-price panel can be used in order to reduce the production cost. A liquid crystal display control circuit of the present embodiment can drive a stripe panel which does not employ a delta arrangement. In such a case, the switch section 233 and the switch section 533 are not necessary. A liquid crystal display control circuit of the present embodiment can drive a panel which is designed to be driven based on a method other than the line inversion driving method. In this case, the inversion sections 620 and 630 are not necessary.

In the above example, value N of the 1/N frequency divider 210 is 6, and value M of the 1/M frequency divider 510 is 5. However, according to the present embodiment, values N and M are appropriately changed according to the type of panels. It should be noted, however, that when the first and second panels have different numbers of pixels or operate based on different driving methods, the clock frequency of the reference signal of the horizontal system output is different between these panels, and therefore, it is necessary to set N and M to different values. In addition to the above, these frequency dividers may be designed such that the division ratio can be changed by a user. In this case, the panel selection flexibility in the production of AV devices is further increased.

By using a liquid crystal display control circuit of the present invention, it is possible to simultaneously drive three or more display panels. In this case, each of the display panels has a horizontal system output pulse generation section. The horizontal system output pulse generation section generates a reference signal for the corresponding panel from signal VCOCLK1 output from a VCO. Each display panel further includes a H-counter which uses the reference signal as a clock.

A liquid crystal display control circuit of the present invention can be used in an AV device which has a liquid crystal panel for a monitor (first panel) and a liquid crystal panel for an EVF (Electric View Finder) (second panel), such as a digital video camera, or the like.

What is claimed is:

1. A display panel control circuit for controlling display of a first panel and a second panel, the control circuit comprising:
    a voltage controlled oscillator (VCO) for outputting a VCO clock signal;
    a first-panel horizontal system pulse generation section for outputting a horizontal system output pulse group for the first panel, the first-panel horizontal system pulse generation section including a first frequency divider for dividing the frequency of the VCO clock signal by N (N is a positive integer) and a first counter for counting an output signal of the first frequency divider, the first counter being reset synchronously with a horizontal synchronization signal of a video signal; and
    a second-panel horizontal system pulse generation section for outputting a horizontal system output pulse group for the second panel, the second-panel horizontal system pulse generation section including a second frequency divider for dividing the frequency of the VCO clock signal by M (M is a positive integer different from N) and a second counter for counting an output signal of the second frequency divider, both the second frequency divider and the second counter being reset at a timing when the first counter is reset.

2. The display panel control circuit of claim 1, further comprising a vertical system pulse generation section for outputting a horizontal system output pulse group for the first and second panels, the vertical system pulse generation section including a third counter for counting an output signal of the first-panel horizontal system pulse generation section as a clock, the third counter being reset by a vertical synchronization signal.

3. The display panel control circuit of claim 1, further comprising:
    a phase comparator for comparing the phase of an output signal of the first-panel horizontal system pulse generation section and the phase of a horizontal synchronization signal; and
    a smoothing element which receives a comparison result from the phase comparator to feed back a phase error voltage to the voltage controlled oscillator.

* * * * *